Figure 1:
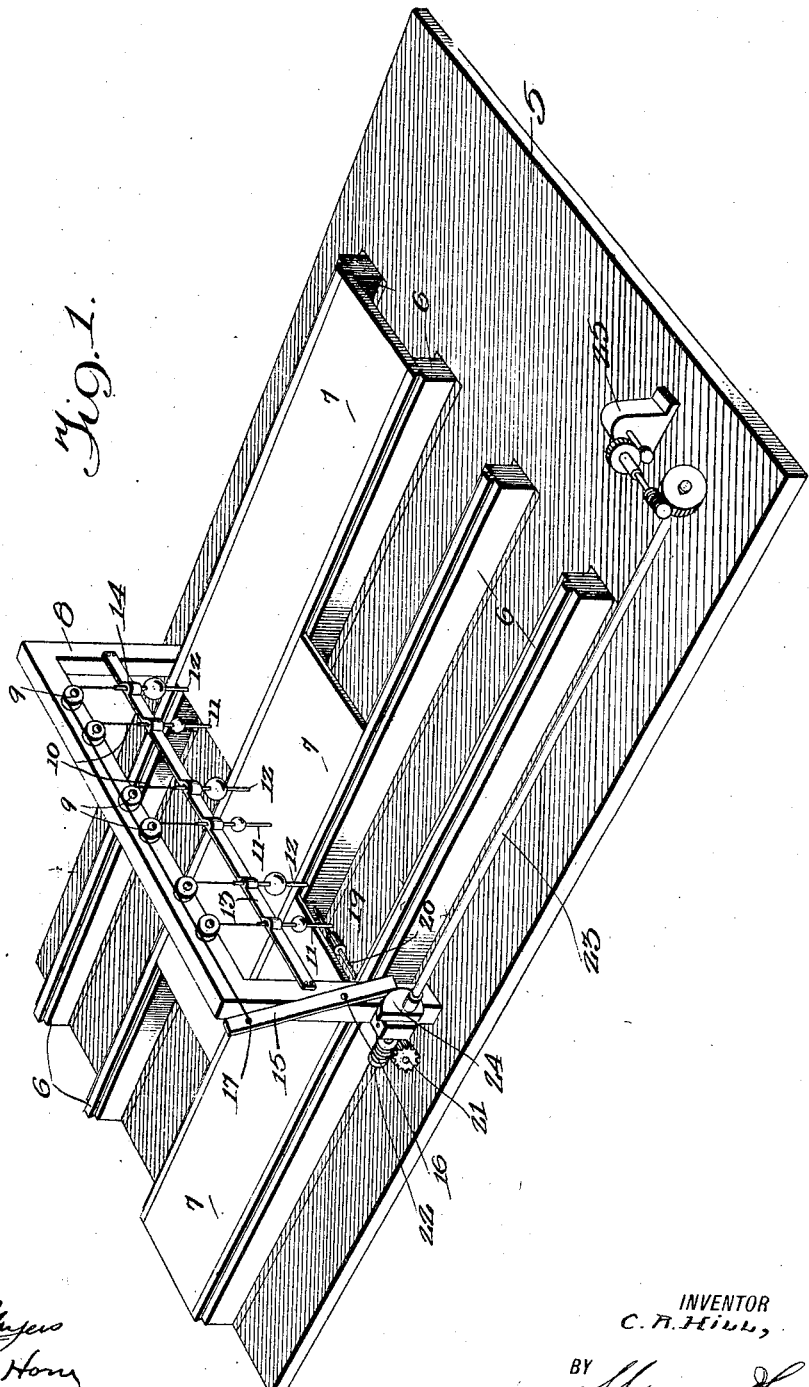

June 12, 1923.

C. R. HILL

TESTING APPARATUS

Filed April 13, 1920

1,458,529

2 Sheets-Sheet 1

WITNESSES

INVENTOR
C. R. Hill,
BY
ATTORNEYS

June 12, 1923.
C. R. HILL
TESTING APPARATUS
Filed April 13, 1920
1,458,529
2 Sheets-Sheet 2
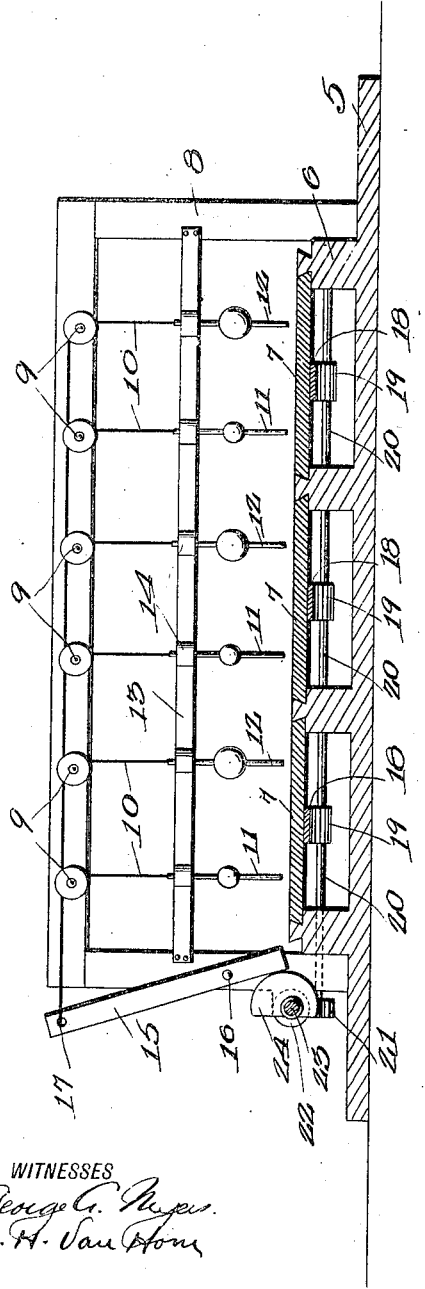
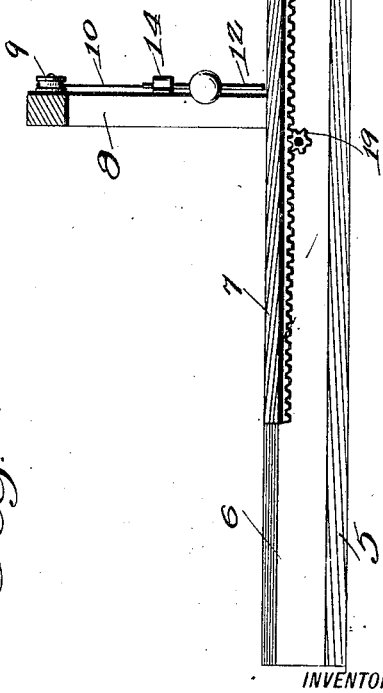

Patented June 12, 1923.

1,458,529

UNITED STATES PATENT OFFICE.

CLAUDE RAYMOND HILL, OF MIDLAND, MICHIGAN.

TESTING APPARATUS.

Application filed April 13, 1920. Serial No. 373,672.

*To all whom it may concern:*

Be it known that I, CLAUDE R. HILL, a citizen of the United States, and a resident of Midland, in the county of Midland and State of Michigan, have invented certain new and useful Improvements in Testing Apparatus, of which the following is a specification.

My invention is an improvement in testing apparatus, and relates more particularly to apparatus for determining the setting time of cements, plasters, or other compositions possessing the property of hardening.

An important object of my invention is to provide an apparatus of the above mentioned character for the purpose of enabling the determination of the interval of time elapsing between the compounding of cements or the like and the setting or hardening of the same.

Another object is to provide an apparatus mentioned above, which will be accurate and simple in its operation.

Other objects and advantages will become apparent during the course of the following description.

In the drawings forming a part of this specification, and in which like numerals are employed to designate like characters through the same, Figure 1 is a perspective view of the apparatus showing separate portions of the test material at different stages during the test, Figure 2 is a vertical cross section through the apparatus, and Figure 3 is a central longitudinal section of the same.

In the drawings, a supporting surface or plate 5, carries a series of keyed guide bars 6 which extend longitudinally of the plate 5. Plates 7 are adapted to slide longitudinally between the guide bars 6 and are for the purpose of carrying test portions of the material to be tested.

A yoke 8 mounted transversely of the plates 7 carries a plurality of pulleys 9, each alternating pulley having connection through a cord 10 with a weighted needle 11 for 12, the needles 11 being weighted to a lesser degree than the needles 12. A cross bar 13 carrying a series of vertical guides 14 for the needles 11 and 12, is mounted on the yoke 8.

An arm 15 is pivoted on one of the arms of the yoke 8, as at 16. The upper end of the arm 15 is apertured and receives a cord 17 common to the pulleys 9.

The plates 7 are provided upon their undersurfaces with rack bars 18 which are engaged by pinions 19 mounted on shaft 20. A worm 21 mounted upon the end of shaft 20, engages a worm 22 mounted upon and rotating with a shaft 23.

A cam 24 is rigidly mounted upon shaft 23 in such a position as to operate arm 15 whenever rotary motion is imparted to the shaft 23. Driving power for shaft 23 is derived by any suitable means employing a gear train for the reduction of speed as shown at 25.

In operation, the material to be tested such as cement or other compositions possessing the quality of hardening, is placed upon the plates 7. As the shaft 23 revolves motion is imparted to the plates 7 and they travel longitudinally at a known rate of speed, preferably at the rate of one inch per hour. At regular intervals of about eight minutes the cam rotating with the shaft 23 causes arm 15 to swing on its pivot and thus gently lower and raise the needles 11 and 12. The operation is very slow and gentle so that no appreciable momentum is given to the needles, they coming to rest of their own weight only on the cement. At the beginning of the test, the material is rather soft and pliable hence the needles produce a series of indentations or impressions as the plate 7 travels along. As the material hardens, these impressions become shallow until a point is reached where the entire weight of the needle is supported without leaving an impression on the surface of the material. The lighter needles 11 determine the initial set and the heavier needles 12 determine the final set of the material. It will thus be seen that by scaling off the lengths of the respective series of impressions on the material being tested and by taking account of the known rate of travel of the plate carrying the material, the time elapsing from the introduction of the material into the apparatus to the occurrence of the initial and the final set is determined.

It is to be understood that various changes in the size, shape and arrangement of parts of the above described apparatus may be resorted to without departing from the spirit of the invention or the scope of the subjoined claims.

Having thus described my invention, what I claim is:

1. The combination of a plurality of sliding plates for carrying the material on test, propulsion means for said plates, a series of weighted needles disposed transversely of the plates, and automatic means for moving said needles into engagement with the material on the plates at regular intervals.

2. An apparatus of the character described, comprising a plurality of plates side by side and movable in the direction of length, a carrier frame extending over said plates, weighted needles guided by said frame, means for lifting said needles including a longitudinal shaft and intermittent devices between said shaft and needles and means for moving the plates.

3. In a device of the character described, a plurality of weighted needles, some needles being weighted to a less degree than others, longitudinally moving platforms for carrying test materials, travelling beneath the needles at a uniform speed, propulsion means for moving said platforms, means for lowering and raising the needles at intervals, relative to the speed of the platforms, including a flexible connector attached at one end of each of the needles, the said flexible connectors being carried over pulleys and attached to a lever, and a cam for reciprocating said lever and mounted upon the main drive shaft of a power source.

4. A device of the character described comprising a needle disposed vertically and being movable in the direction of its length, a carrier movable in a horizontal plane extending beneath the needle, said carrier being adapted to support thereon a material to be tested, means for moving the carrier continuously at a uniform speed, and means operated by said first named means for moving the needle intermittently to alternately lower the needle into contact with the material on the carrier at a speed proportional to the rate of movement of the carrier and then raise the needle.

5. In a testing apparatus, a carrier frame, a plurality of weighted needles guided vertically by the frame, a lever mounted upon the frame and adapted to be reciprocated by some external source of power, and flexible connectors connecting the individual needles with the lever.

6. In a testing apparatus, a plurality of sliding plates, said plates travelling at a uniform rate of speed, means for moving said plates, a plurality of needles suspended above the path of travel of the plates, means for lowering and raising the needles, said means moving the needles relative to the rate of motion of the plates.

7. In a device of the character described, a longitudinally moving plate or plates, means for moving the plate or plates including rack bars mounted on the under side of said plate or plates and pinions to engage said rack bars, a carrier frame mounted to straddle the plate or plates, weighted needles carried by the frame, some of said needles being weighted to a less degree than others, a lever pivotally mounted upon the frame, flexible connectors connecting the needles with the lever, and power means for reciprocating the lever and moving the plate or plates in speed relation.

CLAUDE RAYMOND HILL.